3,009,928
Patented Nov. 21, 1961

3,009,928
9α,11β,21-TRIHALO PROGESTERONES
Hans Reimann, Bloomfield, and David H. Gould, Leonia,
 N.J., assignors to Schering Corporation, Bloomfield,
 N.J., a corporation of New Jersey
No Drawing. Filed May 29, 1961, Ser. No. 113,090
18 Claims. (Cl. 260—397.3)

This invention relates to novel and therapeutically useful halogenated steroids and to methods for their manufacture. In particular, this invention relates to 9α,11β,21-trihalogenated derivatives of progesterone which exhibit valuable progestational properties.

Our novel compounds may be represented by the following formula:

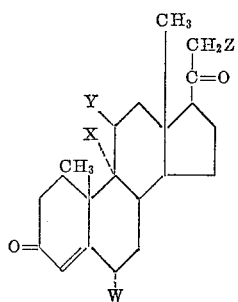

wherein X is a halogen having an atomic weight greater than 19; Y is a halogen having an atomic weight less than 126 and being at least as electronegative as X; Z is halogen, preferably fluorine or iodine; W represents hydrogen or methyl; and the 1-dehydro and 19-nor analogs thereof. These novel compounds are thus 9,11,21-trihalogenated analogs of progesterone, 19-norprogesterone and 1-dehydroprogesterone and the 6α-methyl analogs thereof.

In the above formula, the halogen at C–11 must be at least as electronegative as the halogen present in the 9α-position (fluorine being the most electronegative halogen, and iodine the least electronegative) and further cannot be iodo. Thus, a progesterone of our invention containing a 9α-chloro group may possess an 11β-chloro or an 11β-fluoro group, but cannot contain an 11β-iodo or 11β-bromo group. This artificial restriction as to the electronegativity of the 9- and 11-substituents is necessarily imposed in view of the limitations of the manufacturing process developed below.

Typical progestins embraced by the general formula are 9α,11β-dichloro-21-fluoroprogesterone, 9α,11β-dichloro-21-iodoprogesterone, 9α,11β - dibromo-21-fluoroprogesterone, 9α-chloro-11β,21-difluoroprogesterone, 9α-bromo-11β-chloro-21-fluoroprogesterone, 9α-bromo - 11β,21-difluoroprogesterone, and include their Δ¹-dehydro analogs as well as 19-nor analogs such as 9α,11β-dichloro-21-fluoro-19-norprogesterone. Although all the compounds of our invention are, in general, valuable progestins, the 21-fluoroprogesterones are the preferred species and particularly 9α,11β - dichloro-21-fluoro-progesterone. Included in the foregoing are the 6α-methyl analogs as well as the 21-chloro and 21-bromo analogs.

Our novel compounds are prepared by reacting a 21-halogeno-4,9(11)-pregnadiene-3,20-dione (or 21-halogeno-1,4,9(11)-pregnatriene-3,20-dione or 21-halogeno-19-nor-4,9(11)-pregnadiene-3,20-dione) with a suitable halogenating agent. The starting materials thus necessarily possess a Δ⁹,¹¹-bond, and are prepared by a combination of processes analogous to those described in the literature. For example, the starting compound 21-fluoro-4,9(11)-pregnadiene-3,20-dione (21-fluoro-9(11)-dehydroprogesterone) is prepared from 11β-hydroxy-21-fluoroprogesterone by dehydration as effected by reagents such as methanesulfonyl chloride in the presence of pyridine or phosphorus oxychloride in pyridine. When an 11-hydroxy intermediate is not available, as in the case of 11β-hydroxy-21-fluoro-19-norprogesterone, the hydroxyl group may be introduced microbiologically by means of a microorganism such as *Curvularia lunata* (N.R.R.L. 2380) by procedures analogous to those described in U.S. Patent No. 2,658,023. The 6α-methyl products are prepared in similar manner but starting with a 6α-methyl analog of the foregoing. For example, the starting compound, 6α - methyl-21-iodo-4,9(11)-pregnadiene-3,20-dione (6α - methyl-21-iodo-9(11)-dehydroprogesterone) is prepared from 6α-methyl-11α-hydroxyprogesterone which is convertible to the 9(11)-dehydro compound 6α-methyl-4,9(11)-pregnadiene-3,20-dione (6α-methyl-9(11)-dehydroprogesterone) through the 11α-p-toluenesulfonate ester which is prepared by known esterification techniques and which is subsequently dehydrated by, for example, a refluxing acetic acid solution of anhydrous sodium sulfate. A convenient method of introducing a 21-iodo group into a Δ⁴,⁹⁽¹¹⁾-pregnadiene utilizes as starting compounds the 21-tosylate or mesylate of a 21-hydroxy-Δ⁴,⁹⁽¹¹⁾-pregnadiene which, upon reaction with a reagent such as sodium iodide in acetone according to known procedures, forms a 21-iodo-Δ¹,⁴-pregnadiene. Thus, 21-hydroxy-4,9(11)-pregnadiene-3,20-dione converted by known esterification procedures to the corresponding 21-p-toluenesulfonate ester which is subsequently reacted with sodium iodide in acetone to yield 21-iodo-4,9(11)-pregnadiene-3,20-dione (21-iodo-9(11)-dehydroprogesterone). The introduction of a 21-fluorine into the steroid nucleus is easily effected by treating a 21-iodo compound such as 21-iodoprogesterone and 21-iodo-19-norprogesterone with a reagent such as, for example, silver fluoride in moist acetonitrile to yield 21-fluoroprogesterone and 21-fluoro-19-norprogesterone, respectively. Similarly, by utilizing silver chloride or silver bromide the corresponding 21-chloride or 21-bromide is obtained. The 1-dehydro starting compounds 21-iodo-1,4,9(11)-pregnatriene-3,20-dione (21 - iodo-1,9(11)-bis-dehydroprogesterone) and 21-fluoro-1,4,9(11)pregnatriene-3,20-dione (21 - fluoro-1,9(11)-bisdehydroprogesterone) are prepared from 21-iodo-9(11)-dehydroprogesterone and 21-fluoro-9(11)-dehydroprogesterone by microbiological dehydrogenation with an organism such as, for example, *Corynebacterium simplex* (A.T.C.C. 6946) in a manner similar to that described in U.S. Patent No. 2,837,464, or by chemical dehydrogenation through the use of such reagents as chloranil or selenium dioxide. Similarly, using the above dehydrogenating techniques, a 9α,11β-dihalogenated progesterone falling under the general formula may be converted to its corresponding 1-dehydro analog.

Halogenating agents suitable for use in our process are:

(1) Molecular halogens having a molecular weight greater than 38 and less than 253. This class includes heteroatomic halogen molecules such as iodine monochloride as well as isoatomic halogen molecules such as chlorine and bromine. The molecular halogen employed may be used alone or in admixture with a halide anion. In reactions employing isoatomic molecular halogens, an anion corresponding to the molecular halogen is used. For example, in reactions using molecular chlorine, a suitable chloride salt such as lithium chloride or hydrochloric acid are suitable anion sources. In reactions which employ a heteroatomic molecular halogen, a source of the more electronegative anion is used in a reaction employing iodine monochloride.

(2) Addition compounds of molecular halogens, said molecular halogens having a molecular weight greater than 38 and less than 253. Examples of such addition compounds are pyridinium bromide perbromide, pyridinium chloride perchloride, dioxane dibromide, iodobenzene dichloride, and the like.

(3) N-haloamides in admixture with a halide anion, the halogen in the halide being at least as electronegative as the halogen cation in the N-haloamide, and the combined molecular weight of said halogens being greater than 38 and less than 253. N-haloamides used in these mixtures are such as N-chlorosuccinimide, N-bromoacetamide, dimethyl-N,N-dibromohydantoin, N-iodosuccinimide and the like. Examples of mixtures of N-haloamide and a halide are such as N-chlorosuccinimide and hydrogen chloride; N-bromoacetamide and hydrogen bromide; N-bromoacetamide and lithium chloride; N-bromoacetamide and hydrogen fluoride; N-iodosuccinimide and sodium chloride. These mixtures may have more than one source of halide ion such as in the reagent combination N-chlorosuccinimide, hydrogen chloride and lithium chloride.

Molecular halogens (both isoatomic and heteroatomic) such as chlorine, bromine and iodine monochloride, and molecular halogen addition compounds such as iodobenzene dichloride or pyridinium bromide perbromide employed in our process may be used directly in their commercially available form, in which case they are added directly to the reaction mixture either alone or in a suitable non-reacting solvent such as acetic acid or tetrahydrofuran. The halogenating agent is preferably used in approximately equivalent quantities to that of the steroid.

Alternatively, the halogenating reactant may be prepared in situ. For example, 0.9–1.2 equivalents of halogen cation (based on the amount of steroid) such as is obtained from N-bromosuccinimide is added to a reaction mixture containing a halogen anion of greater or equal electronegativity than the cationic reagent. The halogen anion may be supplied by a hydrohalic acid or by a salt such as sodium bromide, lithium chloride, potassium fluoride, or by mixtures of a hydrohalic acid with an alkali metal halide. Whenever an acid is the source of a halogen anion, approximate theoretical quantities are generally used; whereas if a salt is used as the halogen anion source it may be present in large excess. Such an excess of anion is frequently useful to obtain an increased yield or greater purity of product.

Thus, one of our novel compounds may be prepared by any one of several methods. For example, $9\alpha,11\beta$-dichloro-21-fluoroprogesterone may be prepared from 21-fluoro-9(11)-dehydroprogesterone by utilizing such reagents and combinations as: (1) chlorine and lithium chloride, (2) N-chlorosuccinimide and lithium chloride, (3) sodium chloride, N-chlorosuccinimide together with hydrogen chloride, (4) chlorine alone, (5) chlorine and hydrogen chloride, and (6) iodobenzene dichloride.

A 6,21 - disubstituted-$9\alpha,11\beta$-dihalogeno-1-dehydroprogesterone falling under the general formula such as, for example, $6\alpha$-methyl-21-fluoro-$9\alpha,11\beta$-dichloro-1-dehydroprogesterone may be prepared from $6\alpha$-methyl-21-fluoro-1,9(11)-bisdehydroprogesterone by utilizing ony one of the six reagents and combinations listed above. In addition, our novel 1-dehydrohalogenated progesterones are obtained from the corresponding halogenated progesterones by microbiological or chemical dehydrogenation techniques as heretofore described. Thus $6\alpha$-methyl-21-fluoro-$9\alpha,11\beta$-dichloroprogesterone is converted to $6\alpha$-methyl - 21 - fluoro - $9\alpha,11\beta$ - dichloro - 1 - dehydroprogesterone by the action of a culture of the microorganism *Corynebacterium simplex*.

Our process, whereby a 21-halogeno-9(11)-dehydroprogesterone is converted to a $9\alpha,11\beta,21$-trihalogeno derivative is generally carried out in the presence of a non-reacting solvent at temperatures ranging from 5° C. to 50° C. with reaction times varying from one-half to 24 hours, depending on the reagents involved. It is preferred that the halogen cation source be present in amounts of 0.9–1.2 equivalents based upon the amount of steroid. The choice of solvent in each reaction is naturally determined by the solubility of the reactants in the process. A preferred reaction condition employs glacial acetic acid as the sole or major solvent with the reaction being carried out at room temperature for a period of approximately two hours.

Although glacial acetic acid is frequently the preferred solvent, other solvents are used in our dihalogenation process either alone or in combination with acetic acid. Other solvents which may be employed include lower aliphatic acids such as propionic and diethylacetic, halogenated hydrocarbons such as methylene chloride and chloroform, saturated ethers such as tetrahydrofuran and dioxane, and inert solvents such as dimethylsulfoxide, as well as suitable mixtures of these solvents.

Further, when carrying out the above described process in a halogenated hydrocarbon solvent such as methylene chloride, chloroform or carbon tetrachloride, the yield and purity of the dihalogenated progesterone obtained is greatly increased by adding pyridine to the reaction mixture. Preferably from one to ten equivalents of pyridine is added, based on the amount of steroid being converted. Other organic basic agents which may also be used in conjunction with a halogenated hydrocarbon solvent are aromatic tertiary amines such as lutidine, collidine, alkyl substituted pyridines, and the like. The reaction is usually carried out initially at −20° C. with subsequent warming to about room temperature. The reaction time may be as short as five minutes or as long as one hour. In general, the optimum reaction time is about fifteen minutes.

Our novel dihalogenated progesterones, their 1-dehydro and their 19-nor analogs are active progestational agents by both oral and intramuscular routes, being specific in their action and devoid of androgenic, estrogenic or corticoid activity. That our compounds have progestational activity at all is surprising in view of the art which teaches that the introduction of substitutents into the C-ring of progesterone and its derivatives, such as for example, $11\beta$-hydroxyprogesterone and the acetate thereof, eliminates progestational activity or reduces it to such an extent that the compounds are useless for therapeutic purposes. Our C-ring halogen substituted progesterones, on the other hand, are significantly more active than progesterone by the intramuscular route. Orally our compounds are comparable in activity to ethisterone, the known standard progestational agent.

In addition to being active both orally and intramuscularly, our halogenated progestins possess the added advantage of having a minimum effect on water, sodium and potassium metabolism. Thus they may be administered without causing the usual side effects associated with electrolyte imbalance.

Our therapeutically active compounds are useful for the treatment of conditions requiring progestational agents such as the maintenance of pregnancy, or treatment of functional dysmenorrhea, premenstrual tension, habitual or threatened abortion. When administered orally, our compounds are preferably used in the form of tablets containing from 10 to 100 mg. together with the excipients such as starch or milk sugar. For subcutaneous and intramuscular administration, solutions or suspensions of our compounds with a non-toxic liquid vehicle are used. The dosage required may vary with the indications being treated and may range from about 10 to 25 mg. daily.

Our halogenated progestins are also valuable in the veterinary field for treating conditions in both large and small animals which require a progestational agent. In breeding animals, for example, our compounds are useful in preventing threatened abortion. Additional uses are in controlling egg and milk production by regulating the cycle of chickens and cows by the administration of our progestational agents.

The following examples are illustrative of the procedures employed in preparing the compounds of this invention, but are not to be construed as limiting the scope thereof; the scope of our invention being limited only by the appended claims.

EXAMPLE 1

21-iodo-4,9(11)-pregnadiene-3,20-dione

A. *21-hydroxy-4,9(11) - pregnadiene - 3,20 - dione 21-tosylate.*—To a solution of 10 g. of 21-hydroxy-4,9(11)-pregnadiene-3,20-dione in 200 ml. of pyridine, chilled to −20° C. is added a solution of 10 g. of p-toluenesulfonyl chloride in 50 ml. of methylene chloride. The mixture is stirred in the cold overnight, then a few pieces of ice are added and the mixture diluted with methylene chloride. The organic solution is washed with water, dilute hydrochloric acid, sodium bicarbonate and water. The solution is dried over magnesium sulfate, filtered and concentrated in vacuo to a residue which is crystallized from acetone-hexane to give 21-hydroxy-4,9(11)-pregnadiene-3,20-dione 21 tosylate.

B. *21-iodo-4,9(11)-pregnadiene-3,20 - dione.*—A solution of 5 g. of the 21-tosylate of Example 1A in 50 ml. of acetone containing a few drops of pyridine is warmed slightly and there is added a warm solution of 10 g. of sodium iodide in 20 ml. of acetone. The mixture is warmed on the steam bath for five minutes, then poured into cold water. A solid separates which is filtered, washed with water, and crystallized from acetone-hexane to give 21-iodo-4,9(11)-pregnadiene-3,20-dione $$\lambda_{max.}^{MeOH} \ 240 \ m\mu$$

EXAMPLE 2

21-fluoro-4,9(11)-pregnadiene-3,20-dione

A solution of 5 g. of 21-fluoro-4-pregnene-3,20-dione-11β-ol in a mixture of 20 ml. of dimethylformamide and 5 ml. of dry pyridine is chilled in an ice-bath and there is added dropwise a solution of 4 g. of methane-sulfonyl chloride in 30 ml. of dimethylformamide. Stirring is continued at room temperature for 26 hours, then the mixture is poured into ice water. A solid separates, which is filtered, washed with water and crystallized from acetone-hexane to give 21-fluoro-4,9(11)-pregnadiene-3,20-dione, $$\lambda_{max.}^{MeOH} \ 240 \ m\mu$$

Alternatively, the compound of this example is prepared as follows.

To one gram of 21-iodo-4,9(11)-pregnadiene-3,20-dione (the compound of Example 1) in 10 ml. of acetonitrile containing a trace of water is added 310 mg. of silver fluoride in a 50% aqueous solution. The mixture is stirred about 3 hours at about 30°–40° C. and then filtered. The filtrate is poured into water. A solid separates which is filtered and crystallized from acetone-hexane to give 21-fluoro-4,9(11)-pregnadiene-3,20-dione.

EXAMPLE 3

9α,11β-dichloro-21-iodoprogesterone

To one gram of 21 - iodo - 4,9(11) - pregnadiene - 3,20-dione (the compound of Example 1) dissolved in 30 ml. of carbon tetrachloride at −20° C. there is added a solution of 165 mg. of chlorine gas in 2 ml. of carbon tetrachloride and 0.5 ml. of pyridine. The mixture is stirred at −20° C. for 15 minutes, then allowed to warm to room temperature over a period of ½ hour. The solution is filtered and the filtrate concentrated in vacuo to a residue which is crystallized from acetone-hexane to give 9α,11β-dichloro-21-iodoprogesterone, $$\lambda_{max.}^{MeOH} \ 238 \ m\mu$$

EXAMPLE 4

9α,11β-dichloro-21-fluoroprogesterone

A solution of 1 g. of 21-fluoro-4,9(11)-pregnadiene-3,20-dione (the compound of Example 2) and 4 g. of lithium chloride in 50 ml. of glacial acetic acid is cooled to 10° C. and there is added 250 mg. of hydrogen chloride in 1 ml. of tetrahydrofuran followed by 420 mg. of N-chlorosuccinimide. The solution is stirred at room temperature for 20 minutes in the absence of light and then is poured into ice water with stirring. A precipitate forms which is filtered, washed with water, triturated with ether and crystallized from acetone-hexane to give 9α,11β-dichloro-21-fluoroprogesterone, $$\lambda_{max.}^{MeOH} \ 238 \ m\mu$$

Alternatively, the compound of this example is prepared by reacting the 21-fluoropregnadiene of Example 2 with 220 mg. of chlorine in carbon tetrachloride in the presence of pyridine in a manner similar to that described in Example 3.

EXAMPLE 5

9α-bromo-11β-chloro-21-fluoroprogesterone

To a solution of 1 g. of 21-fluoro-4,9(11)-pregnadiene-3,20-dione (the compound of Example 2) and 4 g. of lithium chloride in 50 ml. of glacial acetic acid there is added 430 mg. of N-bromoacetamide and then 250 mg. of hydrogen chloride in 1 ml. of tetrahydrofuran. The mixture is stirred in the absence of light at room temperature for about 10 minutes. The reaction mixture is poured into ice water with stirring and the resultant solid is filtered, washed with water and crystallized from methylene chloride-pentane to give 9α - bromo - 11β - chloro - 21 - fluoroprogesterone, $$\lambda_{max.}^{MeOH} \ 241 \ m\mu$$

EXAMPLE 6

9α-bromo-11β,21-difluoroprogesterone

To a solution of 1 g. of 21-fluoro-4,9(11)-pregnadiene-3,20-dione (the compound of Example 2) in 50 ml. of diethylacetic acid there is added a solution of 1.2 g. of hydrogen fluoride in 5 ml. of a chloroform tetrahydrofuran mixture followed by 430 mg. of N-bromoacetamide. The solution is stirred at room temperature for 1½ hours, poured into potassium bicarbonate solution with vigorous stirring and then is extracted with methylene chloride. The organic extracts are combined with 5% sodium hydroxide and then with water, dried over magnesium sulfate, filtered and concentrated to a residue. Pentane is added to the residue and a solid separates which is filtered and recrystallized from methylene chloride-pentane to give 9α-bromo-11β,21-difluoroprogesterone.

EXAMPLE 7

9α-chloro-11β,21-difluoroprogesterone

To a solution of 500 mg. of 21-fluoro-4,9(11)-pregnadiene-3,20-dione in 25 ml. of diethylacetic acid there is added 210 mg. of N-chlorosuccinimide followed by a solution of 620 mg. of hydrogen fluoride in 3.5 ml. of a mixture of tetrahydrofuran and chloroform. The reaction mixture is stirred at room temperature for 48 hours then poured into an aqueous sodium carbonate solution. The mixture is extracted with methylene chloride. The organic extracts are combined and evaporated to a residue which is chromatographed on silica gel. The product eluted with 20% ether in hexane is crystallized with acetone-hexane to give 9α-chloro-11β,21-difluoroprogesterone.

EXAMPLE 8

*9α-iodo-11β-chloro-21-fluoroprogesterone*

To a solution of 1 g. of 21-fluoro-4,9(11)-pregnadiene-3,20-dione (the compound of Example 2) in 40 ml. of tetrahydrofuran chilled to 0° C. there is added 3 drops of perchloric acid and 3 g. of lithium chloride followed by the dropwise addition of a solution of 490 mg. of iodine monochloride in 5 ml. of tetrahydrofuran. The reaction mixture is stirred at room temperature for five hours, then poured into ice water. A precipitate forms which is dissolved in methylene chloride. The methylene chloride solution is filtered through a column of Florisil in ether. The eluate is concentrated in vacuo at room temperature to a residue which is triturated with ether. The resultant solid product is filtered and crystallized twice from pentane-methylene chloride to give 9α-iodo-11β-chloro-21-fluoroprogesterone.

EXAMPLE 9

*9α,11β-dibromo-21-fluoroprogesterone*

To a solution of 1 g. of 21-fluoro-4,9(11)-pregnadiene-3,20-dione (the compound of Example 2) and 4 g. of lithium bromide in 50 ml. of acetic acid there is added 430 mg. of N-bromoacetamide followed by a solution of 270 mg. of hydrogen bromide in 4.3 ml. of acetic acid. The mixture is stirred at room temperature for one hour then poured into ice water. A solid precipitates which is filtered, washed with water, and crystallized twice from acetone-hexane to give 9α,11β-dibromo-21-fluoroprogesterone.

EXAMPLE 10

*9α-iodo-11β,21-difluoroprogesterone*

To a solution of 500 mg. of 21-fluoro-4,9(11)-pregnadiene-3,20-dione (the compound of Example 2) and 3 g. of potassium fluoride in 40 ml. of dimethylsulfoxide there is added 340 mg. of N-iodosuccinimide. The reaction mixture is stirred at room temperature for 16 hours, poured into ice water and extracted with methylene chloride. The organic extracts are then treated with decolorizing carbon, filtered and concentrated in vacuo. The resultant residue is chromatographed on silica gel. The fraction eluted with 50% ether-hexane gives 9α-iodo-11β,21-difluoroprogesterone.

EXAMPLE 11

*21-fluoro-19-norprogesterone*

A. *21-hydroxy-19-norprogesterone 21-tosylate.*—In the manner described in Example 1A, 5 g. of 21-hydroxy-19-norprogesterone in pyridine is reacted with 5 g. of p-toluenesulfonyl chloride in methylene chloride and the resultant product isolated and purified to give 21-hydroxy-19-norprogesterone 21-tosylate.

B. *21-iodo-19-norprogesterone.* — The 21-tosylate of Example 11A is reacted with sodium iodide and the resultant product isolated and purified in the manner described in Example 1B to give 21-iodo-19-norprogesterone.

C. *21-fluoro-19-norprogesterone.*—One gram of 21-iodo-19-norprogesterone (the compound of Example 11B) is reacted with 310 mg. of silver fluoride in a 50% aqueous solution and the resultant product isolated and purified in the manner described in the alternative procedure of Example 2 to give 21-fluoro-19-norprogesterone.

EXAMPLE 12

*21-fluoro-19-nor-4,9(11)-pregnadiene-3,20-dione*

A. *11β-hydroxy-21-fluoro-19-norprogesterone.*—A living culture of the organism *Curvularia lunata* (N.R.R.L. 2380) is rinsed from an agar slant under sterile conditions into a sterile medium having the following composition.

| | Percent |
|---|---|
| Malt extract | 5 |
| Sucrose | 1 |
| Sodium nitrate | 0.2 |
| Potassium chloride | 0.05 |
| Magnesium sulfate heptahydrate | 0.05 |
| Ferrous sulfate heptahydrate | 0.05 |
| Dipotassium acid phosphate | 0.1 |

Distilled water, adjusted to pH 7.0 with potassium hydroxide.

100 ml. of this medium is placed in each of several 300 ml. flasks. To each flask is added 50 mg. of 21-hydroxy-19-norprogesterone dissolved in a small volume of acetone. The mixture is shaken for a period of 7 days at a room temperature of about 28° C. The contents of the flasks are then combined and extracted with several portions of ethylene dichloride using one-fifth the volume of the aqueous phase each time. The combined organic extracts are dried over sodium sulfate, filtered and concentrated in vacuo to a residue having a volume of 1-2 ml.

The ethylene dichloride residue is then placed on a chromatographic column consisting of silica gel, mixed with a small volume of methylene chloride. The column is developed with methylene chloride and the eluates are combined and concentrated in vacuo to a residue which is crystallized from acetone-hexane to give 11β-hydroxy-21-fluoro-19-norprogesterone.

B. *21 - fluoro - 19 - nor - 4,9(11) - pregnadiene - 3,20-dione.*—A solution of 2.05 g. of 11β-hydroxy-21-fluoro-19-norprogesterone (the compound of Example 12A) in a mixture of 10 ml. of dimethylformamide and 2 ml. of pyridine is chilled to 0° C. A solution of 1 g. of methanesulfonyl chloride in 10 ml. of dimethylformamide is added dropwise. The reaction mixture is stirred at 0° C. for 80 hours and then is poured into ice-water. A solid precipitate forms which is filtered, washed with water and crystallized from acetone-hexane to give 21-fluoro-19-nor-4,9(11)-pregnadiene-3,20-dione.

EXAMPLE 13

*9α,11β-dichloro-21-fluoro-19-norprogesterone*

In the manner described in Example 3, 1 g. of 21-fluoro-19-nor-4,19(11)-pregnadiene-3,20-dione (the compound of Example 12) is chlorinated with 225 mg. of chlorine in carbon tetrachloride containing 0.75 ml. of pyridine. The product is isolated and purified in the described manner and crystallized with methylene chloride-pentane to give 9α,11β-dichloro-21-fluoro-19-norprogesterone, $\lambda_{max.}^{MeOH}$ 238 mμ

EXAMPLE 14

*21-iodo-1,4,9(11)-pregnatriene-3,20-dione*

A. *21-hydroxy-1,4,9(11)-pregnatriene - 3,20 - dione.*—Five grams of 21-hydroxy-4,9(11)-pregnadiene-3,20-dione is fermented with *Corynebacterium simplex* (A.T.C.C. 6946) according to the procedure of U.S. Patent No. 2,837,464 as follows:

A one hundred ml. broth culture containing a 0.1% yeast extract concentration, 9.0 ml. of 0.2 M $KH_2PO_4$ and 9.0 ml. of 0.2 M $Na_2HPO_4$, contained in a 300 ml. Erlenmeyer flask, is seeded with 1 ml. of a 24-hour broth culture of *Corynebacterium simplex* (A.T.C.C. 6946). The flask is incubated at 28° C. for 24 hours. A second 300 ml. Erlenmeyer flask containing 150 mg. of sterile 21-hydroxy-4,9(11)-pregnadiene-3,20-dione in 5.0 ml. acetone is inoculated with the 24 hour culture of *Corynebacterium simplex* (A.T.C.C. 6946). The culture-containing steroid solution is incubated for 48 hours at 28–30° C.

After termination of the transformation period, the pH is 7.2–7.3. The culture is now directly extracted with 3 equal volumes of $CHCl_3$, the solvent volumes combined and concentrated on a steam bath to a residue which is crystallized from acetone-hexane to give 21-hydroxy-1,4,9(11)-pregnatriene-3,20-dione.

B. *21-hydroxy-1,4,9(11)-pregnatriene-3,20-dione 21-tosylate.*—In the manner described in Example 1A, 10 g. of 21-hydroxy-1,4,9(11)-pregnatriene-3,20-dione (the compound of Example 14A) in pyridine is reacted with a solution of 10 g. of p-toluenesulfonyl chloride in methylene chloride and the resultant product isolated and purified to give 21-hydroxy-1,4,9(11)-pregnatriene-3,20-dione 21-tosylate.

C. *21-iodo-1,4,9(11)-pregnatriene-3,20-dione.*—In the manner described in Example 1B, 5 g. of the 21-tosylate of Example 14B is reacted with 10 g. of sodium iodide and the resultant product isolated and purified to give 21-iodo-1,4,9(11)-pregnatriene-3,20-dione.

EXAMPLE 15

*21-fluoro-1,4,9(11)-pregnatriene-3,20-dione*

In the manner described in the alternative procedure of Example 2, 1 g. of 21-iodo-1,4,9(11)-pregnatriene-3,20-dione (the compound of Example 14) is reacted with 310 mg. of silver fluoride in a 50% aqueous solution and the resultant product isolated and purified to give 21-fluoro-1,4,9(11)-pregnatriene-3,20-dione.

EXAMPLE 16

*9α,11β-dichloro-21-iodo-1,4-pregnadiene-3,20-dione*

21-iodo-1,4,9(11)-pregnatriene-3,20-dione (the compound of Example 14) is chlorinated with chlorine in carbon tetrachloride and in the presence of pyridine according to the procedure of Example 3. The product is isolated and purified in the described manner to give 9α,11β-dichloro-21-iodo-1,4-pregnadiene-3,20-dione.

EXAMPLE 17

*9α,11β-dichloro-21-fluoro-1,4-pregnadiene-3,20-dione*

One gram of 21-fluoro-1,4,9(11)-pregnatriene-3,20-dione (the compound of Example 15) is reacted with 420 mg. of N-chlorosuccinimide and 250 mg. of hydrogen chloride in the presence of 4 g. of lithium chloride in glacial acetic acid in the manner described in Example 4. The resultant product is isolated and purified in the described manner to give 9α,11β-dichloro-21-fluoro-1,4-pregnadiene-3,20-dione.

EXAMPLE 18

*9α-bromo-11β-chloro-21-fluoro-1,4-pregnadiene-3,20-dione*

21-fluoro-1,4,9(11)-pregnatriene-3,20-dione (the compound of Example 15) is reacted with N-bromoacetamide and hydrogen chloride in the presence of lithium chloride in glacial acetic acid in the manner described in Example 5. The resultant product is isolated and purified to give 9α-bromo-11β-chloro-21-fluoro-1,4-pregnadiene-3,20-dione.

EXAMPLE 19

*9α-bromo-11β,21-difluoro-1,4-pregnadiene-3,20-dione*

21-fluoro-1,4,9(11)-pregnatriene-3,20-dione (the compound of Example 15) is reacted with N-bromoacetamide and hydrogen fluoride in diethylacetic acid in the manner described in Example 6. The resultant product is isolated and purified in the described manner to give 9α-bromo-11β,21-difluoro-1,4-pregnadiene-3,20-dione.

EXAMPLE 20

*9α-chloro-11β,21-difluoro-1,4-pregnadiene-3,20-dione*

21-fluoro-1,4,9(11)-pregnatriene-3,20-dione (the compound of Example 15) is reacted with N-chlorosuccinimide and hydrogen fluoride in diethylacetic acid in the manner described in Example 7. The resultant product is isolated and purified in the described manner to give 9α-chloro-11β,21-difluoro-1,4-pregnadiene-3,20-dione.

EXAMPLE 21

*9α-iodo-11β-chloro-21-fluoro-1,4-pregnadiene-3,20-dione*

21-fluoro-1,4,9(11)-pregnatriene-3,20-dione (the compound of Example 15) is reacted with iodine monochloride and lithium chloride in tetrahydrofuran in the presence of perchloric acid in the manner described in Example 8. The resultant product is isolated and purified in the described manner to give 9α-iodo-11β-chloro-21-fluoro-1,4-pregnadiene-3,20-dione.

EXAMPLE 22

*9α,11β-dibromo-21-fluoro-1,4-pregnadiene-3,20-dione*

In the manner described in Example 9, 21-fluoro-1,4,9(11)-pregnatriene-3,20-dione (the compound of Example 15) is reacted with N-bromoacetamide, hydrogen bromide and lithium bromide in acetic acid and the resultant product isolated and purified to give 9α,11β-dibromo-21-fluoro-1,4-pregnadiene-3,20-dione.

EXAMPLE 23

*9α-iodo-11β,21-difluoro-1,4-pregnadiene-3,20-dione*

In the manner described in Example 10, 21-fluoro-1,4,9(11)-pregnatriene-3,20-dione (the compound of Example 15) is reacted with N-iodosuccinimide and potassium fluoride in dimethylsulfoxide and the resultant product isolated and purified to give 9α-iodo-11β,21-difluoro-1,4-pregnadiene-3,20-dione.

EXAMPLE 24

*9α,11β-dichloro-21-fluoroprogesterone*

One gram of 21-fluoro-4,9(11)-pregnadiene-3,20-dione (the compound of Example 2) and 950 mg. of p-iodotoluene dichloride are dissolved in 20 ml. of methylene chloride. The solution is stirred for 5 hours at room temperature, then concentrated in vacuo to a residue which is crystallized from acetone-hexane to give 9α,11β-dichloro-21-fluoroprogesterone.

EXAMPLE 25

*6α-methyl-21-iodo-4,9(11)-pregnadiene-3,20-dione*

A. *6α-methyl-11α-hydroxyprogesterone p-toluenesulfonate.*—A solution of 10 g. of 6α-methyl-11α-hydroxyprogesterone in 40 ml. of chloroform and 50 ml. of dry pyridine is chilled in ice and 12 g. of p-toluenesulfonyl chloride is added in small portions. The reaction mixture is stirred at 0° C. for 1 hour, then allowed to stand at room temperature for 18 hours. The mixture is then poured into ice-water, stirred thoroughly and extracted with chloroform. The organic solution is washed with water and concentrated in vacuo to a residue which is triturated with a small amount of methanol and filtered to give 6α-methyl-11α-hydroxyprogesterone p-toluenesulfonate, which is used without further purification in the next step.

B. *6α-methyl-4,9(11)-pregnadiene-3,20-dione.* — To a solution of 15 g. of anhydrous sodium acetate in 140 ml. of acetic acid, heated to about 110° C., is added 10 g. of the 11α-p-toluenesulfonate of Example 25A. The solution is refluxed for 30 minutes, then chilled in ice and diluted with cold water. A solid product forms which is filtered, washed with dilute acetic acid, dried at room temperature and crystallized from acetone-hexane to give 6α-methyl-4,9(11)-pregnadiene-3,20-dione.

C. *6α-methyl-21-iodo-4,9(11)-pregnadiene-3,20-dione.*—To a solution of 10 g. of 6α-methyl-4,9(11)-pregnadiene-3,20-dione (prepared as described in Example 25B) in a mixture of 75 ml. of tetrahydrofuran and 40 ml. of methanol is added 18 g. of iodine and 18 g. of finely powdered calcium oxide. The mixture is stirred at room temperature for three hours, then poured into about 1.5 l. of cold water containing 65 ml. of acetic acid. The product is extracted with methylene chloride and the extracts washed with water, dried over magnesium sulfate and filtered. The filtrate is concentrated in vacuo to a residue which is chromatographed on Florisil. The material eluted with 30% ether in hexane is crystallized from methylene chloride-hexane to give 6α-methyl-21-iodo-4,9(11)-pregnadiene-3,20-dione.

EXAMPLE 26

6α-methyl-9α,11β-dichloro-21-iodoprogesterone

One gram of 6α-methyl-21-iodo-4,9(11)-pregnadiene-3,20-dione (the compound of Example 25) is dissolved in 30 ml. of carbon tetrachloride and there is added at −20° C. a solution of 160 mg. of chlorine in 2 ml. of carbon tetrachloride and 0.25 ml. of pyridine. The mixture is stirred at −20° C. for 15 minutes, then allowed to warm to room temperature over a period of one-half hour. The solution is filtered and the filtrate concentrated in vacuo to a residue which is crystallized from acetone-hexane to give 6α-methyl-9α,11β-dichloro-21-iodoprogesterone.

EXAMPLE 27

6α-methyl-21-fluoro-4,9(11)-pregnadiene-3,20-dione

To 5 g. of 6α-methyl-21-iodo-4,9(11)-pregnadiene-3,20-dione (the compound of Example 25) dissolved in 100 ml. of acetonitrile containing 1 ml. of water, there is added a 50% aqueous solution of 1.5 g. of silver fluoride. The mixture is warmed to 30–40° C. for 4 hours, then filtered and the filtrate poured into water. The resultant suspension is filtered and crystallized from acetone-hexane to give 6α-methyl-21-fluoro-4,9(11)-pregnadiene-3,20-dione.

EXAMPLE 28

6α-methyl-9α,11β-dichloro-21-fluoroprogesterone

A solution of 1 g. of 6α-methyl-21-fluoro-4,9(11)-pregnadiene-3,20-dione (the compound of Example 27) and 4 g. of lithium chloride in 50 ml. of glacial acetic acid is cooled to about 10° C. and there is added 250 mg. of hydrogen chloride in 1 ml. of tetrahydrofuran followed by 400 mg. of N-chlorosuccinimide. The solution is stirred at room temperature for 20 minutes in the absence of light, then is poured into ice-water with stirring. A precipitate forms which is filtered, washed with water, triturated with ether and crystallized from acetone-hexane to give 6α-methyl-9α,11β-dichloro-21-fluoroprogesterone.

An alternative method for preparing the compound of this example is as follows:

5.4 g. of 6α-methyl-21-fluoro-4,9(11)-pregnadiene-3,20-dione (prepared as described in Example 27) and 5 g. of p-iodotoluene dichloride is dissolved in 100 ml. of methylene chloride. The solution is stirred for five hours at room temperature, then concentrated in vacuo to a residue which is crystallized from acetone-hexane to give 6α-methyl-9α,11β-dichloro-21-fluoroprogesterone.

EXAMPLE 29

6α-methyl-9α-chloro-11β,21-difluoroprogesterone 500 mg. of 6α-methyl-21-fluoro-4,9(11)-pregnadiene-3,20-dione (the compound of Example 27) is dissolved in 25 ml. of diethylacetic acid and there is added 200 mg. of N-chlorosuccinimide followed by a solution of 620 mg. of hydrogen fluoride in 3.2 ml. of a mixture of tetrahydrofuran in chloroform. The reaction mixture is stirred at room temperature for 48 hours, then is poured into an aqueous sodium carbonate. The mixture is extracted with methylene chloride. The organic extracts are combined and evaporated to a residue which is chromatographed on silica gel. The product eluted with 25% ether in hexane is crystallized from acetone-hexane to give 6α-methyl-9α-chloro-11β,21-difluoroprogesterone.

EXAMPLE 30

6α-methyl-9α-bromo-11β-chloro-21-fluoroprogesterone

One gram of 6α-methyl-21-fluoro-4,9(11)-pregnadiene-3,20-dione (the compound of Example 27) and 4 g. of lithium chloride are dissolved in 40 ml. of glacial acetic acid. The solution is cooled to about 10° C. and there is added 250 mg. of hydrogen chloride in 1 ml. of tetrahydrofuran followed by 410 mg. of N-bromoacetamide. The solution is stirred at room temperature for 20 minutes in the absence of light, then is poured into ice-water with stirring. A precipitate forms which is filtered, washed with water, triturated with ether and crystallized from acetone-hexane to give 6α-methyl-9α-bromo-11β-chloro-21-fluoroprogesterone.

EXAMPLE 31

6α-methyl-9α-iodo-11β-chloro-21-fluoroprogesterone 500 mg. of 6α-methyl-21-fluoro-4,9(11)-pregnadiene-3,20-dione (the compound of Example 27) is dissolved in 20 ml. of acetic acid and there is added 330 mg. of N-iodosuccinimide and a solution of 60 mg. of hydrogen chloride in 2.2 ml. of tetrahydrofuran followed by 2 g. of lithium chloride. The mixture is stirred at room temperature for 20 minutes, then poured into water and extracted with methylene chloride. The organic extracts are washed with dilute aqueous sodium bicarbonate solution and then with water. The solution is dried over magnesium sulfate, filtered and concentrated in vacuo to a residue which is crystallized from methylene chloride-pentane to give 6α-methyl-9α-iodo-11β-chloro-21-fluoroprogesterone.

Alternatively, the compound of this example is prepared as follows:

To a solution of 1 g. of 6α-methyl-21-fluoro-4,9(11)-pregnadiene-3,20-dione (the compound of Example 27) in 40 ml. of tetrahydrofuran which is chilled to 0° C., there is added 3 drops of perchloric acid and 3 g. of lithium chloride followed by the dropwise addition of a solution of 499 mg. of iodine monochloride in 5 ml. of tetrahydrofuran. The reaction mixture is stirred at room temperature for 5 hours, then poured into ice-water. A precipitate forms which is dissolved in methylene chloride. The methylene chloride solution is filtered through a column of Florisil in ether. The eluate is concentrated in vacuo at room temperature to a residue which is triturated with ether, filtered and crystallized from methylene chloride-pentane to give 6α-methyl-9α-iodo-11β-chloro-21-fluoroprogesterone.

EXAMPLE 32

6α-methyl-9α,11β-dibromo-21-fluoroprogesterone 500 mg. of 6α-methyl-21-fluoro-4,9(11)-pregnadiene-3,20-dione (the compound of Example 27) and 2 g. of lithium bromide are dissolved in 25 ml. of acetic acid and there is added 205 mg. of N-bromoacetamide followed by a solution of 120 mg. of hydrogen bromide in 2.2 ml. of acetic acid. The mixture is stirred at room temperature for one hour, then poured into ice-water. A solid precipitates which is filtered, washed with water and crystallized twice from methylene chloride-pentane to give 6α-methyl-9α,11β-dibromo-21-fluoroprogesterone.

EXAMPLE 33

6α-methyl-21-iodo-1,4,9(11)-pregnatriene-3,20-dione

A. *6α-methyl-1,4,9(11)-pregnatriene-3,20-dione.*—Five grams of 6α-methyl-4,9(11)-pregnadiene-3,20-dione (the compound of Example 25B) is fermented with *Corynebacterium simplex* (A.T.C.C. 6946) according to the procedure of U.S. Patent No. 2,837,464 as follows:

100 ml. broth culture containing a 0.1% yeast extract concentration, 9.0 ml. of 0.2 M $KH_2PO_4$ and 9.0 ml. of 0.2 M $Na_2HPO_4$, contained in a 300 ml. Erlenmeyer flask, is seeded with 1 ml. of a 24-hour broth culture of *Corynebacterium simplex* (A.T.C.C. 6946). The flask is incubated at 28° C. for 24 hours. A second 300 ml. Erlenmeyer flask containing 150 mg. of sterile 6α-methyl-4,9-(11)-pregnadiene-3,20-dione in 5.0 ml. acetone is inoculated with the 24 hour culture of *Corynebacterium simplex* (A.T.C.C. 6946). The culture-containing steroid solution is incubated for 48 hours at 28° to 30° C.

After termination of the transformation period, the pH is 7.2–7.3. The culture is now directly extracted with 3 equal volumes of $CHCl_3$, the solvent volumes combined and concentrated on a steam bath to a residue which is crystallized from acetone-hexane to give 6α-methyl-1,4,9-(11)-pregnatriene-3,20-dione.

B. *6α-methyl - 21-iodo-1,4,9(11)-pregnatriene - 3,20-dione.*—10 g. of 6α-methyl-1,4,9(11)-pregnatriene-3,20-dione (prepared as described in Example 33A) is reacted with 18 g. of iodine and 18 g. of powdered calcium oxide according to the procedure of Example 25C. The resultant product is isolated and purified in the described manner to give 6α-methyl-21-iodo-1,4,9(11)-pregnatriene-3,20-dione.

Alternatively, the compound of this example is prepared by the following procedure:

C. Five grams of 6α - methyl - 21 - iodo-4,9(11)-pregnadiene-3,20-dione (the compound of Example 25) is subjected to the action of a culture of the microorganism *Corynebacterium simplex* in the manner described in Example 33A. The resultant product is isolated and purified in the described manner to give 6α-methyl-21-iodo-1,4,9-(11)-pregnatriene-3,20-dione.

EXAMPLE 34

*6α-methyl-21-fluoro-1,4,9(11)-pregnatriene-3,20-dione*

Five grams of 6α - methyl - 21 - iodo - 1,4,9(11)-pregnatriene-3,20-dione (the compound of Example 33) is reacted with 1½ g. of silver fluoride according to the procedure of Example 27. The resultant product is isolated and purified in the described manner to give 6α-methyl-21-fluoro-1,4,9(11)-pregnatriene-3,20-dione.

Alternatively, the compound of this example is prepared by subjecting 6α - methyl - 21-fluoro-4,9(11)-pregnadiene-3,20-dione (the compound of Example 27) to the action of a culture of *Corynebacterium simplex* in the manner described in Example 33A to give 6α-methyl-21-fluoro-1,4,9(11)-pregnatriene-3,20-dione.

EXAMPLE 35

*6α-methyl-9α,11β-dichloro-21-iodo-1,4-pregnadiene-3,20-dione*

One gram of 6α-methyl-21-iodo-1,4,9(11)-pregnatriene-3,20-dione (the compound of Example 33) is reacted with 160 mg. of chlorine in carbon tetrachloride in the presence of 0.25 ml. of pyridine according to the procedure of Example 26. The resultant product is isolated and purified in the described manner to give 6α-methyl-9α,11β-dichloro-21-iodo-1,4-pregnadiene-3,20-dione.

Alternatively, the compound of this example is prepared by subjecting 6α - methyl-9α,11β-dichloro-21-iodo-progesterone (the compound of Example 26) to the action of a culture of the microorganism *Corynebacterium simplex* in the manner described in Example 33A. The resultant product is isolated and purified in the described manner to give 6α - methyl-9α,11β-dichloro-21-iodo-1,4-pregnadiene-3,20-dione.

EXAMPLE 36

*6α-methyl-9α,11β-dichloro-21-fluoro-1,4-pregnadiene-3,20-dione*

One gram of 6α - methyl - 21 - fluoro - 1,4,9(11)-pregnatriene-3,20-dione (the compound of Example 34) is reacted with 400 mg. of N-chlorosuccinimide in the presence of hydrogen chloride and lithium chloride in the manner of Example 4. The resultant product is isolated and purified in the described manner to give 6α-methyl-9α,11β-dichloro-21-fluoro-1,4-pregnadiene-3,20-dione.

Alternatively, the compound of this example is prepared by subjecting 6α-methyl-9α,11β-dichloro-21-fluoroprogesterone (the compound of Example 28) to the action of a culture of the microorganism *Corynebacterium simplex* in the manner described in Example 33A to give 6α - methyl - 9α,11β - dichloro-21-fluoro-1,4-pregnadiene-3,20-dione.

In a similar manner, 6α-methyl-9α,11β,21-trihalogenoprogesterones prepared as described in Examples 29, 30, 31 and 32, are converted by the action of *Corynebacterium simplex* to the corresponding 1-dehydro analogs to give respectively, 6α-methyl-9α-chloro-11β,21-difluoro-1,4-pregnadiene-3,20-dione, 6α - methyl-9α - bromo-11β-chloro-21 - fluoro-1,4-pregnadiene-3,20-dione, 6α-methyl-9α-iodo-11β-chloro-21-fluoro - 1,4-pregnadiene-3,20-dione, and 6α-methyl-9α,11β-dibromo-21-fluoro-1,4-pregnadiene-3,20-dione.

This application is a continuation-in-part application of our copending applications, Serial Nos. 817,052, now abandoned, and 817,053, both filed on June 1, 1959.

We claim:

1. Compounds of the group consisting of 6α-W-9α-X-11β-Y-21-Z-progesterones, 6α - W - 9α - X-11β-Y-21-Z-19-norprogesterones, and 6α-W-9α-X-11β-Y-21-Z-1-dehydroprogesterones wherein W is a member of the group consisting of hydrogen and methyl; X is a halogen having an atomic weight greater than 19; Y is a halogen having an atomic weight less than 126 and being at least as electronegative as X; and Z is halogen.

2. 9α-X-11β-Y-21-Z-6α-methylprogesterone wherein X is a halogen having an atomic weight greater than 19; Y is a halogen having an atomic weight less than 126 and being at least as electronegative as X; and Z is halogen.

3. 9α - X-11β-Y-21-Z-6α-methyl-1-dehydroprogesterone wherein X is a halogen having an atomic weight greater than 19; Y is a halogen having an atomic weight less than 126 and being at least as electronegative as X; and Z is halogen.

4. 9α-X-11β-Y-21-Z-progesterones wherein X is a halogen having an atomic weight greater than 19; Y is a halogen having an atomic weight less than 126 and being at least as electronegative as X; and Z is halogen.

5. 9α-X-11β-Y-21-Z-1-dehydroprogesterones wherein X is a halogen having an atomic weight greater than 19; Y is a halogen having an atomic weight less than 126 and being at least as electronegative as X; and Z is halogen.

6. 9α,11β-dichloro-21-iodoprogesterone.

7. 9α,11β-dichloro-21-fluoroprogesterone.

8. 9α,11β-dichloro-21-fluoro-19-norprogesterone.

9. 9α,11β-dichloro-21-iodo-1,4-pregnadiene-3,20-dione.

10. 9α,11β - dichloro - 21-fluoro-1,4-pregnadiene-3,20-dione.

11. 21-fluoro-4,9(11)-19-norpregnadiene-3,20-dione.

12. 6α-methyl-9α,11β-dichloro-21-iodoprogesterone.

13. 6α-methyl-9α,11β-dichloro-21-fluoroprogesterone.

14. 6α - methyl - 9α,11β - dichloro - 21-iodo-1-dehydroprogesterone.

15. 6α - methyl - 9α,11β - dichloro - 21 - fluoro - 1-dehydroprogesterone.

16. 6α-methyl-9α-chloro-11β,21-difluoroprogesterone.

17. 6α - methyl - 9α-bromo-11β-chloro-21-fluoroprogesterone.

18. Compounds of the group consisting of 6α-methyl-21-Z-9(11)-dehydroprogesterone and 6α-methyl-21-Z-1,-9(11)-bis-dehydroprogesterone wherein Z is halogen.

No references cited.